(12) United States Patent
Sethi (10) Patent No.: US 7,389,336 B2
(45) Date of Patent: Jun. 17, 2008

(54) PACING NETWORK PACKET TRANSMISSION USING AT LEAST PARTIALLY UNCORRELATED NETWORK EVENTS

(75) Inventor: Bhupinder S. Sethi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 10/350,667

(22) Filed: Jan. 24, 2003

(65) Prior Publication Data

US 2004/0148387 A1 Jul. 29, 2004

(51) Int. Cl.
G06F 15/13 (2006.01)

(52) U.S. Cl. .................. 709/223; 709/235; 370/230; 370/412

(58) Field of Classification Search .............. 709/223, 709/235; 370/230, 412
See application file for complete search history.

(56) References Cited

U.S. PATENT DOCUMENTS

| 5,317,563 | A  * | 5/1994  | Oouchi et al. ........... 370/232 |
| 5,706,436 | A  * | 1/1998  | Lewis et al. ............. 709/235 |
| 6,192,411 | B1   | 2/2001  | Chan et al. .............. 709/232 |
| 6,215,769 | B1   | 4/2001  | Gani et al. .............. 370/230 |
| 6,934,745 | B2 * | 8/2005  | Krautkremer ........... 709/223 |
| 7,065,586 | B2 * | 6/2006  | Ruttenberg et al. ..... 709/244 |
| 2001/0032269 | A1 | 10/2001 | Wilson ................... 709/235 |
| 2004/0073640 | A1* | 4/2004 | Martin et al. ........... 709/223 |

FOREIGN PATENT DOCUMENTS

CN 1344456 4/2002

WO WO 02/076023 9/2002

OTHER PUBLICATIONS

RFC 793, "Transmission Control Protocol", http://ietf.org, 89 pages, no date.
RFC 1122, "Requirements for Internet Hosts—Communication Layers", http://ietf.org, 116 pages, no date.
RFC 2581, "TCP Congestion Control", http://ietf.org, 14 pages, no date.
Aron, Mohit and Druschel, Peter; "Soft Timers: Efficient Microsecond Software Timer Support for Network Processing"; *17th ACM Symposium on Operating Systems Principles (SOSP '99)*; Dec. 1999; pp. 232-246.
Mogul, Jeffrey C.; "Observing TCP Dynamics in Real Networks"; *SigComm '92 Conference Proceedings; Communications Architectures & Protocols*; Aug. 1992; pp. 305-317.

(Continued)

*Primary Examiner*—Jinsong Hu
(74) *Attorney, Agent, or Firm*—Workman Nydegger (57) ABSTRACT

A sending computing system sends a number of network packets to a receiving computing system over a specific network connection. The sending computing system monitors at least partially uncorrelated network events to extract a soft timer that schedules transmissions based on the uncorrelated network events such as feedback events (e.g., acknowledgment messages) when sending the packets using TCP. Since potentially even all of the network connections are used, the events are less correlated from the sending of packets over the specific connection. The extracted timer is then used to pace the packets being sent out over the specific connection. The packets being sent out may be marked in a way as to regulate the frequency of occurrence of the uncorrelated network events being monitored.

21 Claims, 4 Drawing Sheets

OTHER PUBLICATIONS

Park; Hyoung-Woo and Chung; Jin-Wook; "Improvement of Congestion Control for Burst Traffic"; *Proceedings of the International Conference on Parallel and Distributed Processing Techniques and Applications*; PDPTA '2000 Part vol. 2, 10 pgs, no date.

* cited by examiner

PACING NETWORK PACKET TRANSMISSION USING AT LEAST PARTIALLY UNCORRELATED NETWORK EVENTS

BACKGROUND OF THE INVENTION

1. The Field of the Invention

The present invention relates to communications technology, and more specifically, to mechanisms for pacing the transmission of network packets using a soft timer that is generated from at least partially uncorrelated network events.

2. Background and Relevant Art

Computing technology has transformed the way we work and play. Modem computer networking technologies and infrastructures allow for different applications and users to communicate data electronically even over vast distances relatively quickly using readily-available computing systems. Such computing systems may include, for example, desktop computers, laptop computers, Personal Digital Assistants (PDAs), digital telephones, or the like.

Currently, computing systems are so interconnected that one computing system is literally capable of communicating with any one of many millions of other computing systems spread throughout the globe. This is useful as we are now able to communicate more readily. In its most general form, communication between computing systems involves the formation of an electronic message. That electronic message is then broken down into smaller fragments. These fragments along with any appropriate header information are called "packets".

The various packets of the electronic message are transmitted from a sending computing system to a receiving computing system. In order to properly route the packets, there are a number of intermediary computing systems that logically reside between the sending computing system and the receiving computing system. Typically, such intermediary computing systems receive and route packet transmissions coming from a large number of different computing systems.

In order to have the high scalability required to deal with the reception of packet transmissions from different computing systems, the intermediary computing system may have a queue, in which the packet is placed until the intermediary computing system can properly process the packet. The size of the queue is typically sufficient to handle some fluctuations in the packet receive rate. If there is a short-term period in which the packets are received faster than the intermediary computing system is capable of processing them, then the queue will fill more. On the other hand, if the packets are processed at a faster rate than there are received, the queue will empty more.

In suitable intermediary computing systems, the intermediary computing system is capable of processing the incoming requests at at least the average rate at which the packets are received. Accordingly, the queue tends towards being empty rather than being filled. This is because if the queue is filled, then packets may be dropped, thereby frustrating the purpose of the queue itself.

Even in suitable intermediary computing systems that are designed to process at a greater rate than the average packet receive rate, the queue may become overfilled in certain situations in which the packets arrive in a burst. This can happen in some feedback-oriented transmission protocols in which a sending computing system sends one or more packets in a burst, then waits for an acknowledgment from the receiving computing system before sending out more packets in a burst. The intensity of the phenomenon of packets arriving in bursts is often referred to herein as "burstiness".

It is important to limit burstiness in the global Internet. To accomplish this in Transmission Control Protocol (TCP), the protocol most commonly used for data transfer over networks such as the Internet, the sending computing system typically sends two packets in a burst, and then waits for an acknowledgement message from the receiving computing system before sending out two more packets in a burst. However, this is an expensive method of limiting burstiness, since every acknowledgement packet sent by the receiver consumes resources on every intermediary computing system as well as the sending computing system. While it is important to limit burstiness on intermediary computing systems, it is also advantageous to reduce the number of packets emitted by the receiving computing system.

Having the receiver wait for more than two packets before emitting an acknowledgement packet has practical difficulties (it increases response time for short messages). An unconventional technology called Sender Moderated Acknowledgements allows the sender to indicate dynamically to the receiver which data packets it should acknowledge. Both of these methods increase the burstiness of packets on that particular connection.

One way to reduce the burstiness-of packet transmission is to pace the timing of the packets so that there is sufficient time between the sending of one packet and the sending of the next thereby stabilizing the packet transmission rate. Timing issues are typically controlled by a timer implemented in software within an operating system. Such timers typically operate on a scale of 10milliseconds or so. In fast networks that support one GigaBit Per Second (Gbps) transmission rates, this timing simply does not have sufficient granularity to pace packets. Even in the future, if faster timers were to become available, network transmission rates may go up as well. Accordingly, timer-based pacing of packet transmission is typically not considered a feasible option.

Accordingly, what would be advantageous are mechanisms for pacing the transmission of packets even though the operating system timer does not support fine enough clock increments to support such pacing.

BRIEF SUMMARY OF THE INVENTION

The foregoing problems with the prior state of the art are overcome by the principles of the present invention, which are directed towards mechanisms for pacing network packets when transmitting network packets from a sending computing system to a receiving computing system via one or more intermediary computing systems. If the network packets are transmitted in a burst, then the queues within the intermediary computing systems may overfill. Accordingly, pacing the transmission of electronic messages reduces the chance that any of the intermediary computing systems will overfill and thereby drop a network packet.

In order to properly pace the network packets, the sending computing system monitors at least partially uncorrelated network events to extract a timer that schedules transmissions based primarily on the uncorrelated network events. These partially uncorrelated network events may include, for example, the receipt of acknowledgement messages, the sending of packets, and the receiving of packets over more or even all connections that are maintained by the sending computing system. Since potentially even all the network connections are used, the events are less correlated than the sending of packets over the specific connection. The extracted timer is then used to pace the packets being sent out over the specific connection.

Over time, the occurrence rate of the monitored network events may change. One may compensate for this by either changing the timer, or even regulating the occurrence rate itself. For example, if the network events are feedback events such as the receipt of Transmission Control Protocol (TCP) acknowledgment messages, then the sending computing system might roughly regulate the occurrence rate by indicating to the receiver that it should change the number of packets it should receive before sending out an acknowledgement packet. Conventionally, on any given connection, a receiver sends out an acknowledgement packet immediately after receiving two packets from the sender. However, in accordance with the principles of the present invention, the number of TCP packets sent per acknowledgement message may be adjusted as desired to obtain a particular acknowledgment message rate.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

A sending computing system is to send a number of network packets to a receiving computing system over a specific connection. The sending computing system monitors at least partially uncorrelated network events to extract a timer that schedules transmissions based on the uncorrelated network events. The at least partially uncorrelated network events may be, for example, the receipt of acknowledgement messages, the sending of packets, and the receiving of packets over more or even all connections that are maintained by the sending computing system. Since potentially even all of the network connections are used, the events are less correlated from the packet send events that occur the specific connection. The extracted timer is then used to pace the packets being sent out over the specific connection. In order to maintain control over the granularity of the extracted timer, the rate of network events may be regulated by periodically indicating to the receiver how frequently it needs to send acknowledgement packets in response to the data packets that the sender transmits.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code.

Figure 1:
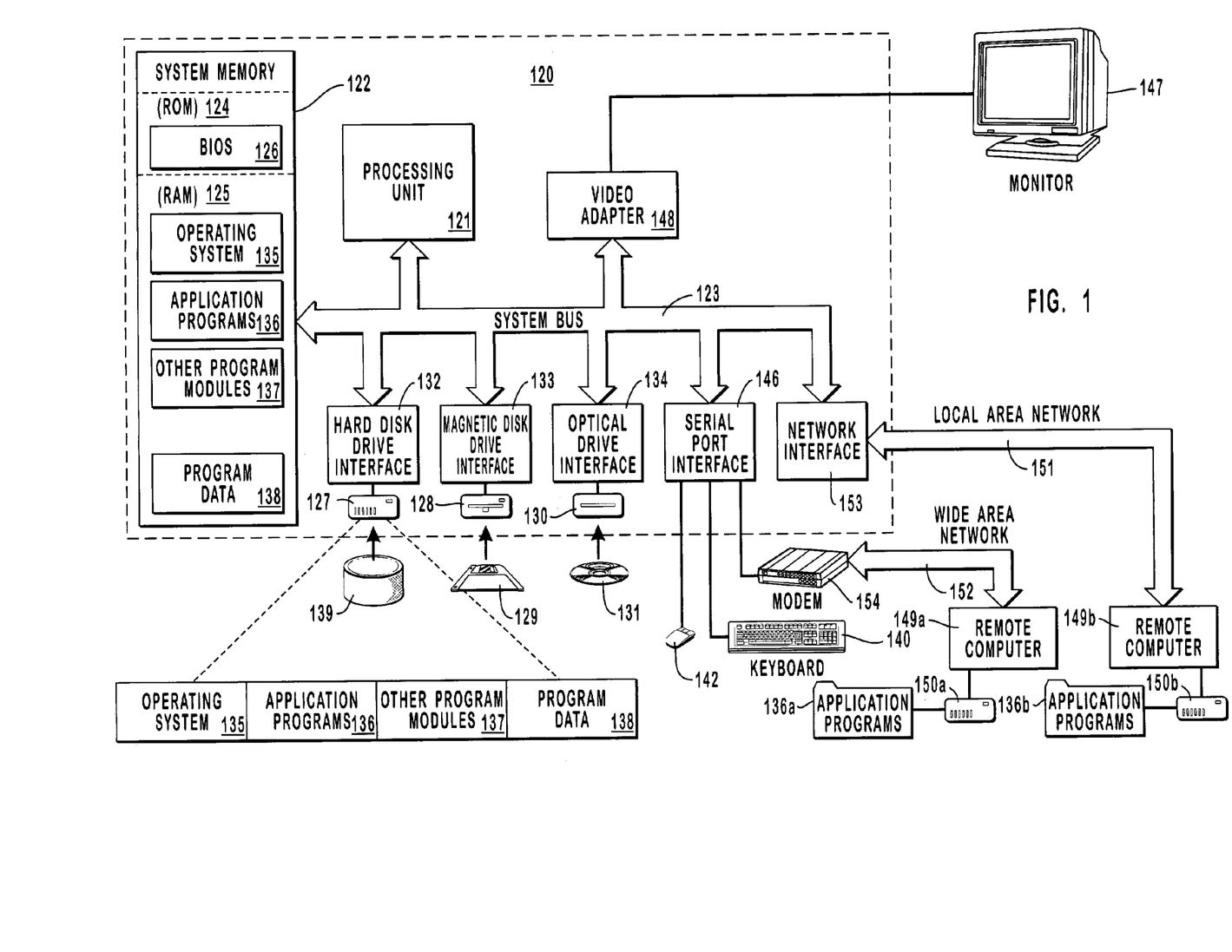
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system may implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
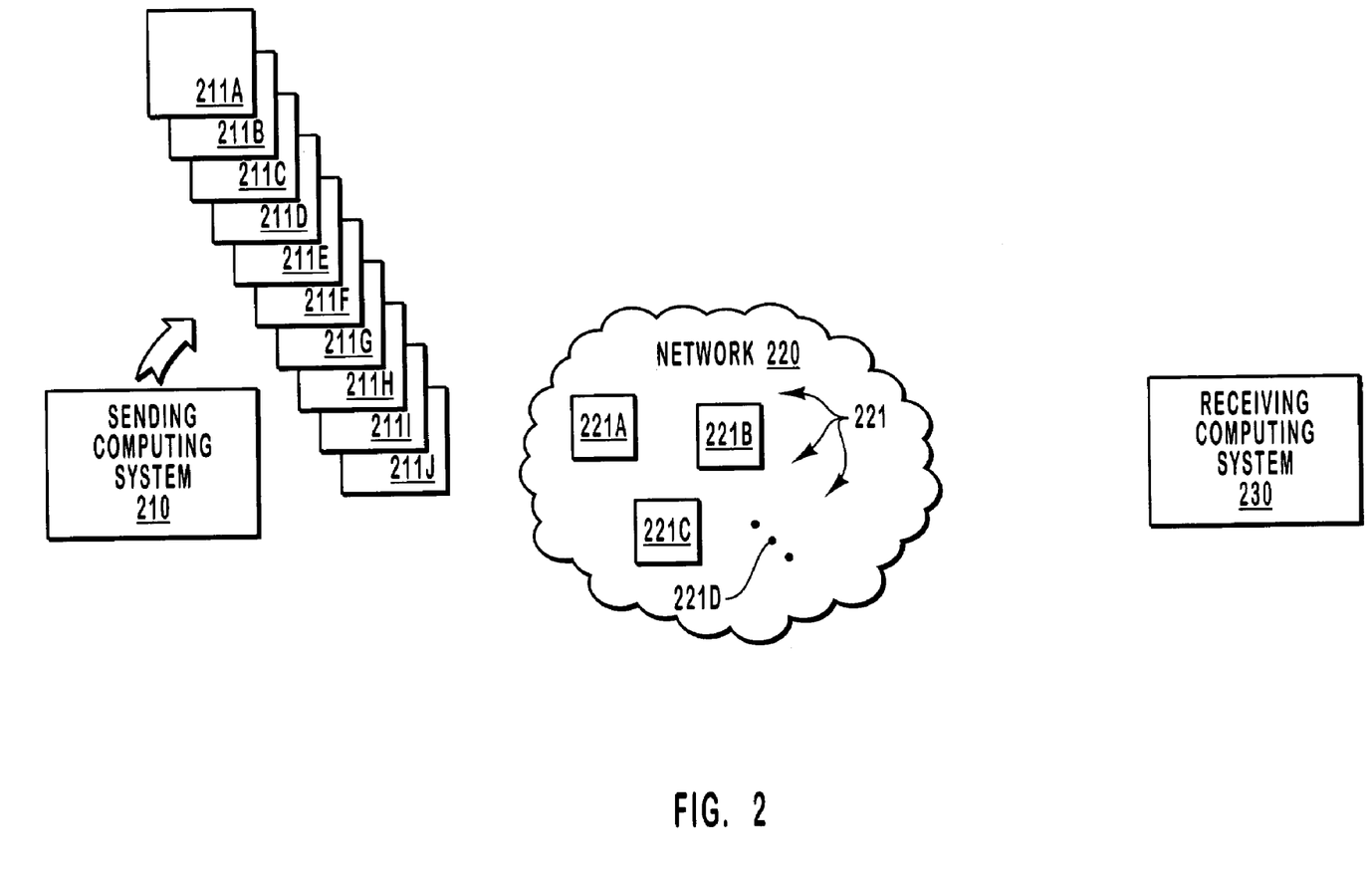
FIG. 2 illustrates a network environment in which a sending computing system sends network packets to a receiving computing system over one or more intermediary computing systems.

FIG. 2 illustrates a computer network 200 that includes a sending computing system 210 that sends a plurality of network packets 211 (e.g., network packets 211A through 211J) through network 220 to a receiving computing system 230. The sending computing system 210 and the receiving computing system 230 may each be a client or a server computing system and, although not required, may be structured as described above with respect to the computer 120 of FIG. 1.

The network 220 includes a number of intermediary computing systems 221 including computing systems 221A, 221B, 221C among potentially many others as represented by the ellipses 221D. The network 220 may be, for example, the Internet. As each network packet is transmitted, the network packet will be routed through one or more of the intermediary computing systems before arriving at the receiving computing system 230.

Conventionally, the network packets 211 are dispatched two packets at a time in quick succession into the network 220 in clusters called "bursts". The burst size may be increased by the protocol to values larger than two packets to reduce the number of acknowledgements received by the sender. Transmitting in this fashion can cause the queues in the intermediary computing systems that route the packets to overfill, resulting in network packets being dropped during transmission. This is particularly true if the intermediary computing system is a bottleneck in the routing path.

Figure 3:
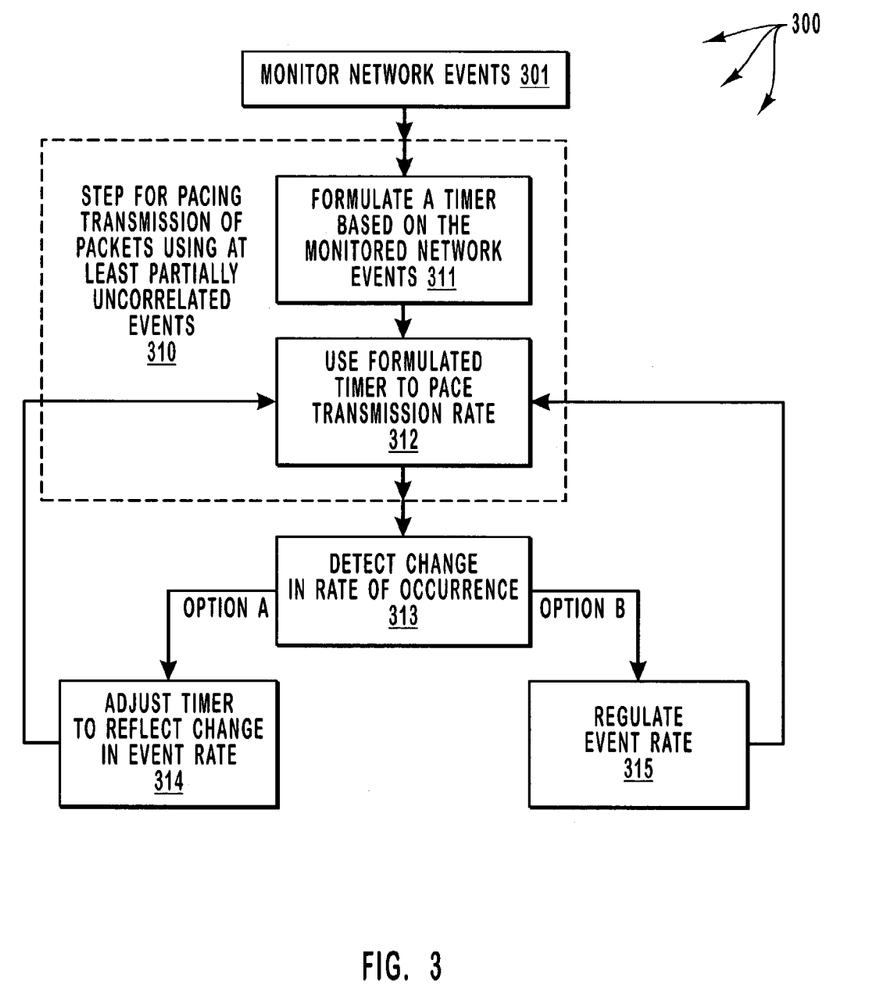
FIG. 3 illustrates a flowchart of a method for pacing network packets in accordance with the principles of the present invention.

FIG. 3 illustrates a method 300 for pacing the transmission of packets so as to reduce the chance that any of the network packets will be lost. The method 300 may be performed by the sending computing system 210 illustrated in FIG. 2 when sending packets 211 to receiving computing system 230 as is primarily described below. However, the sending computing system 210 may also perform the method 300 when delivering packets to other receiving computing systems as well. In addition, the receiving computing system 230 may also act as a sending computing system that sends network packets outbound. Accordingly, the receiving computing system 230 may perform the method 300.

Figure 4:
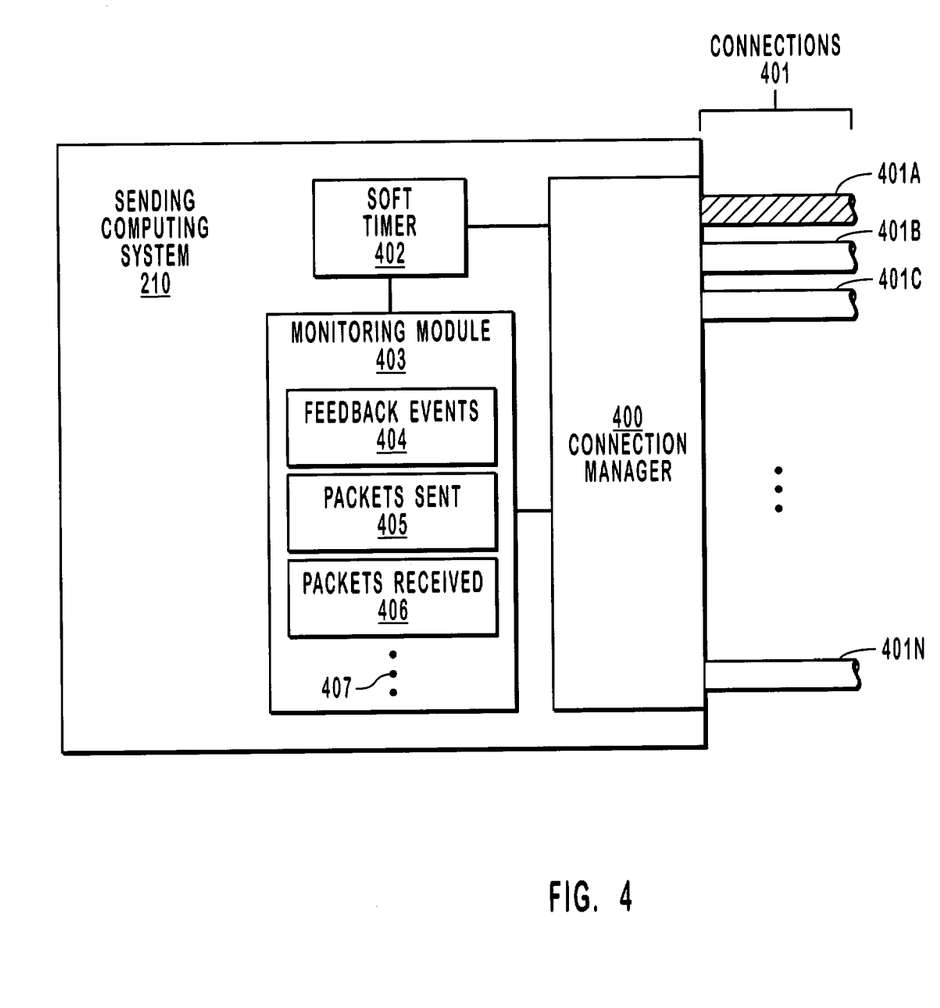
FIG. 4 schematically illustrates a sending computing system in accordance with the principles of the present invention.

FIG. 4 illustrates a schematic logical diagram of the salient components of the sending computing system 210 used when pacing the transmission of packets in accordance with the principles of the present invention. Accordingly, the method of FIG. 3 will be described with frequent reference to the components of FIG. 4.

The method 300 first monitors network events that are at least partially uncorrelated with a packet transmission (act 301). Referring to FIG. 4, the sending computing system maintains a number of separate connections 401. A connection is a logical mechanism whereby information may be communicated to and/or received from another computing system. In this case, a connection manager 400 has a number of open connections including connections 401A, 401B, and 401C through 401N. In this example, the connection manager 400 uses connection 401A to send packets to the receiving computing system 230 as represented by the striped-look of the connection 401A.

As previously mentioned, the monitored events are at least partially uncorrelated with packet transmission events that occur over the connection 401A. This lack of correlation may be promoted by monitoring network events that occur over one or more or even all of the other connections 401B through 401N, in addition to or instead of similar events that occur on the connection 401A. Such events may include packet send or receive events, as well as packet feedback events. A monitoring module 403 is coupled to the connection manager 400 so that partially uncorrelated network events may be monitored.

For example, a feedback events module 404 may monitor feedback events such as acknowledgment messages received in response to packets sent. Transmission Control Protocol (TCP), for example, has provisions for such acknowledgment messages returned in response to the receipt of TCP packets. Stream Control Transmission Protocol (SCTP) may similarly use such acknowledgement messages. In addition, although User Datagram Protocol (UDP) is widely considered to be push-oriented, a protocol called TCP Friendly Rate Control (TFRC) may be layered above UDP in the protocol stack to enable acknowledgment messages being returned in response to the receipt of UDP packets. In addition, another network transport protocol that returns acknowledgment messages is described in further detail in commonly-assigned, co-pending U.S. patent application Ser. No. 09/884,634, entitled "Networking System and Method for the Transmission of Reliable and Non-Reliable Data in a Common Sliding Window", and filed Jun. 19, 2001, which is incorporated herein by reference in its entirety. The network transport protocol described in that application will be referred to herein as "DirectPlay".

Feedback events are by far not the only type of partially uncorrelated network events that may be monitored. A packets-sent module 405 may monitor packet send events. A packets received module 406 may monitor packet receive events. Other modules may also be included for monitoring other types of at least partially uncorrelated network events as represented by the vertical ellipses 407. A soft timer 402 is also shown in FIG. 4 and may function as described below. Although the connection manager 400, the soft timer 402, the monitoring module 403 and its contained modules 404 through 407 are described as being separate modules for purposes of clarity, these modules may also be combined into a fewer number of more monolithic modules as desired while still remaining well within the scope of the principles of the present invention.

Any partially uncorrelated network event will suffice for purposes of the present invention. However, for illustrative purposes, and not by way of limitation, the method 300 will be described using a frequent example in which the at least partially uncorrelated network events are feedback events in the form of TCP acknowledgment events received over all of the connections 401 in response to TCP packets dispatched from the sending computing system 210 being received by their respective destinations.

The sending computing system 210 then performs a functional, result-oriented step for pacing the transmission of packets based primarily on the at least partially uncorrelated network events (step 310). This functional, result-oriented step may include any corresponding acts for accomplishing the above-mentioned pacing. However, in the illustrated example of FIG. 3, the step 310 includes corresponding acts 311 and 312.

Specifically, the step 310 first includes a corresponding act of formulating a timer that is based primarily on the monitored network events (act 311). The timer is based "primarily" on the monitored network events in that some uncorrelated non-network events may also be used in the pool of uncorrelated events from which the timer is extracted. However, since the uncorrelated events are mostly or "primarily" network events, the rate of the uncorrelated events may be more easily controlled as is described further below. Then, the step 310 includes a corresponding act of using the formulated timer to pace a rate at which a plurality of packets are transmitted from the sending computing system to the receiving computing system over the particular connection (act 312).

The precise mechanism whereby the timer is formulated based primarily on the monitored events is not important to the present invention. There are a number of formulation techniques that may be used, some of which are now described for purposes of illustration only, and not for purposes of limitation.

In one example, the processor's cycle counter is used in tandem with the monitored network events to extract a soft timer. Processors like the INTEL x86 series of processors, maintain an internal counter that is incremented by one every cycle. This counter can be queried by programs running on the processor, and is an accurate way to measure time elapsed. Each time packets on the connection need to be sent, the program paces the packets by scheduling the packets to be sent out at particular points of time. Some packets may be sent immediately, and the rest will be queued to be sent at specific time points in the future. For each of these packets to be sent out in the future, the program calculates what the value of the cycle counter will be when the specific packet needs to be sent out. The packets are put on a queue, with the associated cycle counter values. For each subsequent monitored network event, the timer checks the value of the cycle counter at that point, and if it is greater than the cycle counter value at which the packet was supposed to be sent out, the packet is sent out.

This timer formulation method works well if the processor frequency remains constant as it typically does with servers. However, in other devices such as laptops, the processor frequency may vary according to workload. In that case, the timer may determine a maximum amount of time that occurred between consecutive monitored events over the most recently detected network events. For example, suppose that the maximum amount of time that occurred between consecutive acknowledgment messages (e.g., over the last one thousand acknowledgment messages) was 2.5 microseconds. Now suppose in order to pace the packet transmission properly, each packet transmission should be separated by approximately 10 microseconds. The formulated timer may prompt transmission of packets only after four monitored network events have been detected since the last packet transmission over the same connection.

In order to compensate for the fact that 2.5 microseconds represents a maximum monitored event time, rather than an average monitored event time, the number of required monitored events that occur between each packet may be multiplied by a safety factor. For example, if the safety factor was 1.5, then the timer would prompt packet transmission only after six monitored network events have been detected since the last packet transmission over the same connection. A maximum value may be desired due to the relative algorithmic simplicity in calculating the maximum time between monitored network events as opposed to calculating the average time between monitored network events.

The rate at which the monitored events occur is not at all constant, and varies potentially significantly over time. For example, suppose that the monitored events were TCP acknowledgement messages received over all of the connections 401. At one heavy network traffic time, the TCP acknowledgment messages may be received on average at about a rate of one message every 2.5 microseconds. Now suppose that network traffic has declined since then such that there is only one TCP acknowledgment message every 5.0 microseconds. Without any compensation for this, the packet transmission pacing would be slowed down.

Accordingly, after determining that the rate at which the monitored network events are occurring has changed since the timer was formulated (act 313), the method may optionally compensate for any impending change in the packet transmission pacing rate by performing either or a combination of act 314 illustrated as option A, and/or act 315 illustrated as option B.

In particular, the formulated timer may be adjusted to reflect the changed rate of the monitored network events (act 314). For example, if the network event rate is cut in half due to reduced network traffic, then the timer may be incremented twice the previous amount whenever a monitored event occurs. Alternatively, perhaps the number of monitored events that should occur between consecutive packets transmitted over a single connection may be cut in half.

Alternatively or in addition, the rate at which the monitored network events occur may be regulated to at least partially compensate for the changed rate of the monitored network events (act 315). For example, suppose that the monitored network events are TCP acknowledgement messages and that an unconventional method has been implemented in which one acknowledgement message is returned for every four TCP packets sent. In that case, if the TCP acknowledgment message rate were to be cut in half due to declining network traffic, the sending computing system may adjust by having a TCP acknowledgement message returned for every two TCP packets sent. This would once again increase the TCP acknowledgment message rate to about its original value even though the rate of TCP packet transmission was cut in half.

Conventionally, TCP allows for one TCP acknowledgement to be returned for every two TCP packets sent. However, there exists an unconventional mechanism whereby the percentage of TCP packets sent per acknowledgment message may be decreased below one in every two, even during steady-state, by marking only those TCP packets that should result in a TCP acknowledgment message being returned. Such an unconventional mechanism is described in further detail in commonly-assigned, co-pending U.S. patent application Ser. No. 09/548,712, entitled "Method and System for Controlling the Rate of Acknowledgement of Communication Packets", and filed Apr. 13, 2000, which is incorporated herein by reference in its entirety. Similar techniques might be employed to change the number of acknowledgment messages sent per UDP packet or per DirectPlay packet.

The time between occurrences of such monitored events may typically be much shorter than the current granularity of a timer within an operating system. For example, the timer with many conventional operating systems may be configured to perform consecutive actions no sooner than every one or ten milliseconds. On the other hand, consecutive monitored network events may occur on the order of microseconds, or even nanoseconds. Accordingly, the formulated timer in accordance with the present invention allows for fine-grained control over the timing of consecutive actions even if those consecutive actions need to be timed to occur microseconds, or even nanoseconds, apart from each other. Such consecutive actions need not be just the transmission of network packets, but may include other consecutive actions such as the sending of data over a system bus, for example.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer network that includes a sending computing system and a receiving computing system, wherein the sending computing system transmits network packets to the receiving computing system, a method for the sending computing system pacing the transmission of the plurality of packets that are sent to the receiving computing system so as to reduce the chance that any of the network packets will be lost in the transmission, the method comprising the following performed by the sending computing system:

an act of the sending computing system monitoring network events that primarily occur over one or more connections other than a first connection;

an act of the sending computing system formulating a timer that is based primarily on the monitored network events that primarily occur over the one or more connection other than the first connection, wherein formulating a timer comprises:

determining how many monitored network events should occur between sequential packets transmitted over the first connection:

an act of the sending computing system, upon transmitting a first packet over the first connection, computing a value of the sending computer's cycle counter and storing the value; and an act of the sending computing system, upon detecting a monitored network event over the one or more connections other than the first connection, comparing a current value of the cycle counter to the stored value of the cycle counter and upon determining that the current value has reached the stored value, transmitting a second packet from the sending computing system to the receiving computing system over the first connection and such that the sending computing system directly controls the rate at which the packets are scheduled for transmission from the sending computing system to the receiving computing system to the receiving computing system, and wherein the second packet is transmitted only upon the occurrence of the determined of monitored events after the transmission of the first packet.

2. A method in accordance with claim 1, wherein the act of monitoring network events that primarily occur over one or more connections other than a first connection comprises the following:
an act of monitoring network events over all of the connections supported by the sending computing system.

3. A method in accordance with claim 1, wherein the act of monitoring network events that primarily occur over one or more connections other than a first connection comprises the following:
an act of monitoring feedback events that represent acknowledgements that packets transmitted over a plurality of connections have been received.

4. A method in accordance with claim 1, wherein the act of monitoring network events that primarily occur over one or more connections other than a first connection comprises the following:
an act of monitoring packets sent over a plurality of connections.

5. A method in accordance with claim 1, wherein the act of monitoring network events that primarily occur over one or more connections other than a first connection comprises the following:
an act of monitoring packets received over a plurality of connections.

6. A method in accordance with claim 1, wherein the act of monitoring network events that primarily occur over one or more connections other than a first connection comprises the following:
an act of monitoring feedback events that represent acknowledgements that TCP packets transmitted over a plurality of connections have been received.

7. A method in accordance with claim 1, further comprising the following:
an act of determining that the rate at which the monitored network events are occurring has changed since the timer was formulated.

8. A method in accordance with claim 7, further comprising the following:
an act of adjusting the timer to reflect the changed rate of the monitored network events.

9. A method in accordance with claim 7, further comprising the following:
an act of regulating the rate at which the monitored network events occur to at least partially compensate for the changed rate of the monitored network events.

10. A method in accordance with claim 9, wherein the monitored network events comprise feedback events that represent acknowledgment that one or more packets have been received, and wherein the act of regulating the rate at which the monitored network events occur comprises the following:
an act of changing the number of packets that are acknowledged by a feedback event over a plurality of connections.

11. A method in accordance with claim 10, wherein the packets are TCP packets and wherein the feedback events are TCP acknowledgement messages.

12. A method in accordance with claim 10, wherein the packets are UDP packets and wherein the feedback events are TFRC acknowledgment messages.

13. A method in accordance with claim 10, wherein the packets are DirectPlay packets.

14. A method in accordance with claim 10, wherein the packets are SCTP packets and wherein the feedback events are SCTP acknowledgment messages.

15. A method in accordance with claim 1, wherein storing the value further comprises the following:
storing the value with the corresponding packet to be sent when the cycle counter exceeds the stored value.

16. A method in accordance with claim 15, wherein the value and the corresponding packet are stored in a queue.

17. A method in accordance with claim 1 wherein the number of monitored network events that should occur between sequential packets transmitted over the first connection is based on an average amount of time between consecutive network events and further comprising:
an act of multiplying the number of monitored network events that should occur between sequential packets by a safety factor.

18. A method as recited in claim 1, wherein the first and second packets comprise packets other than acknowledgement packets.

19. A method in accordance with claim 1, wherein the sending computing system further uses the formulated timer to pace data communications over a system bus.

20. A computer program product comprising one or more computer storage media storing computer-executable instructions for implementing the method of claim 1.

21. A computing system comprising a processor and one or more computer storage media storing computer-executable instructions for implementing the method of claim 1.

* * * * *